Figure 1:
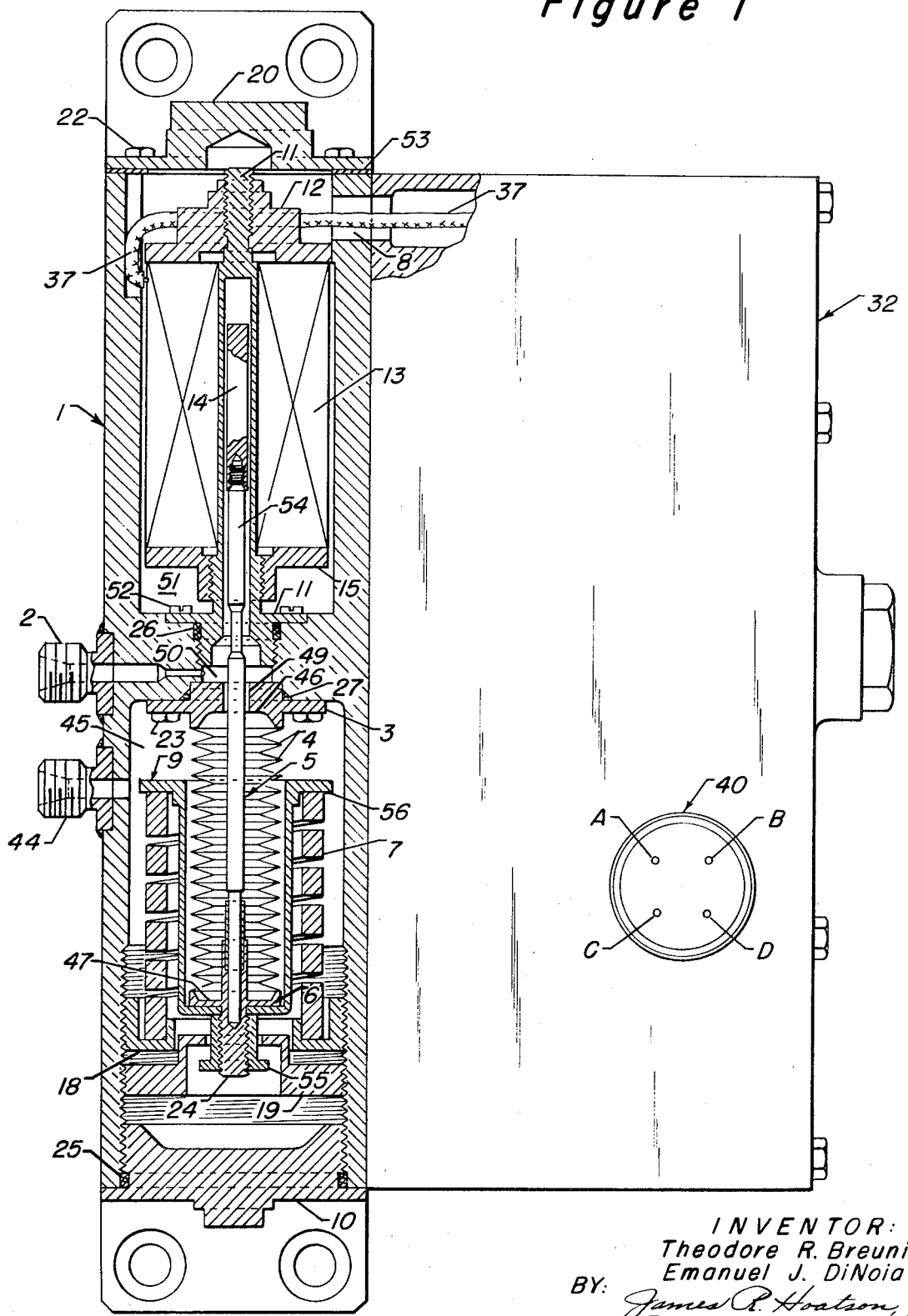

United States Patent
Breunich et al.

[15] 3,662,603
[45] May 16, 1972

[54] DIFFERENTIAL PRESSURE TRANSDUCER

[72] Inventors: Theodore R. Breunich, Stamford, Conn.; Emanuel J. Dinoia, Briarcliff Manor, N.Y.

[73] Assignee: Universal Oil Products Company, Des Plaines, Ill.

[22] Filed: Jan. 14, 1971

[21] Appl. No.: 106,581

Related U.S. Application Data

[63] Continuation-in-part of Ser. No. 819,918, Apr. 28, 1967, abandoned.

[52] U.S. Cl. .................................73/398 R, 73/407, 323/51
[51] Int. Cl. ...........................................................G01l 9/10
[58] Field of Search ........................73/398 A, 407 R; 336/30; 323/51

[56] References Cited

UNITED STATES PATENTS 3,555,405  9/1967  Martin.......................................323/51

Primary Examiner—Donald O. Woodiel
Attorney—James R. Hoatson, Jr. and Charles H. Thomas, Jr.

[57] ABSTRACT

A differential pressure transducer utilizing a transformer and a means for maintaining a constant voltage sum on the secondary leads of the transformer to eliminate errors due to spurious electrical impulses in the transducer. The extensible end of a bellows moves a magnetically permeable core with respect to the transformer, thereby inducing different voltages on separate secondary loops longitudinally spaced along the transformer.

6 Claims, 2 Drawing Figures

INVENTOR:
Theodore R. Breunich
Emanuel J. DiNoia
BY: James R. Hoatson, Jr.
Philip T. Liggett
ATTORNEYS

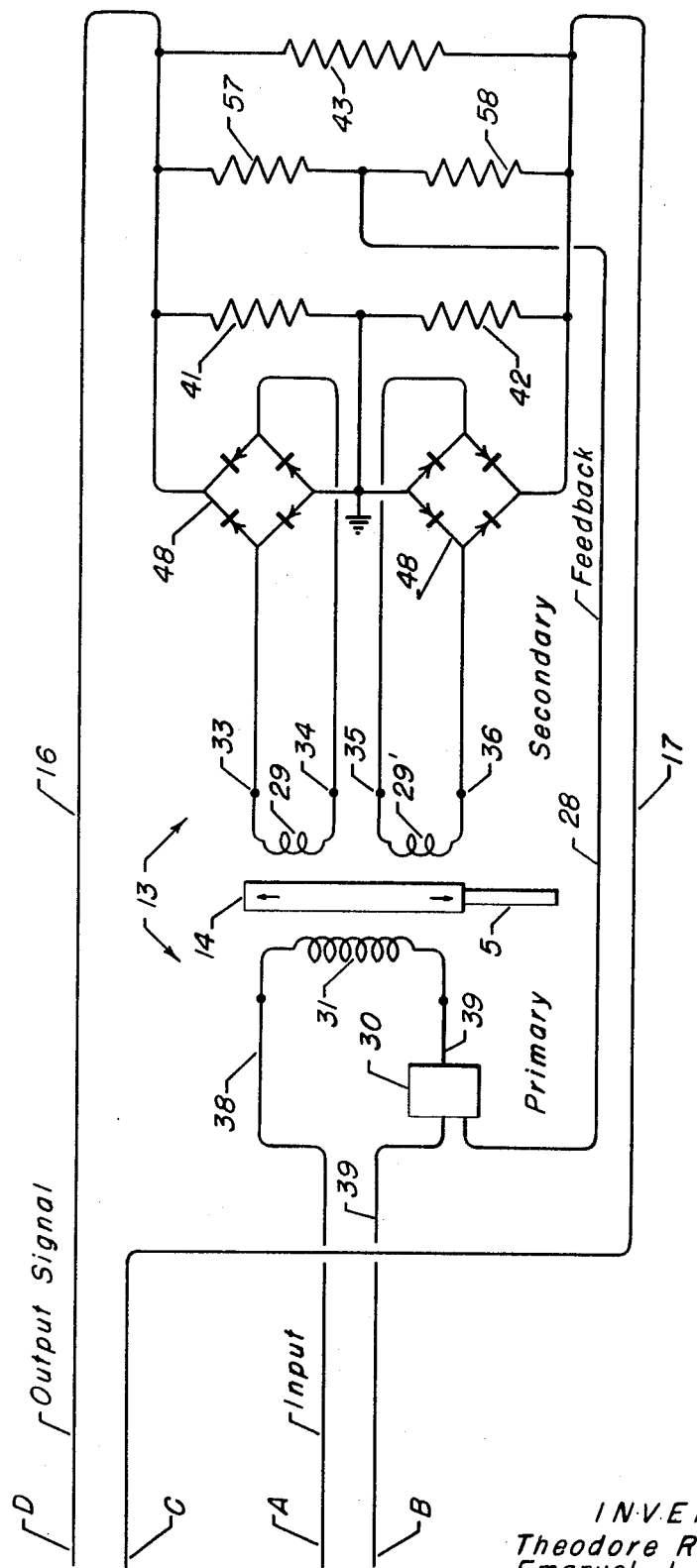

DIFFERENTIAL PRESSURE TRANSDUCER

This application is a continuation in part of application Ser. No. 819,918 filed Apr. 28, 1969, now abandoned.

This invention relates to a differential pressure transducer utilizing a transformer and a means for maintaining a constant voltage sum on the secondary leads of the transformer to eliminate errors due to spurious electrical impulses in the transducer. The extensible end of a bellows moves a magnetically permeable core with respect to the transformer, thereby inducing different voltages on separate secondary loops longitudinally spaced along the transformer. The differential pressure transducer is used to make an accurate analogue conversion from a pressure differential, between pressures at environments to be compared, to a voltage differential, between secondary loops of a transformer. Normally, the conversion that is easiest with which to work is one that is linear, though the differential pressure transducer of this invention is not limited to such an application. The invention in its preferred form may be used to operate in any fluid medium over any range of pressures, though its superiority over conventional differential pressure transducers is most pronounced when it is activated by a changing depth in sea water. Other possible applications include aeronautical instrumentation and pressure vessel regulation.

One important feature of this invention is the manipulation of the currents produced in the secondary loops of the transformer of this invention in order to preclude interference in the final output voltages or currents by spurious electrical impulses in the system. A portion of the core and the primary and secondary loops of the transformer of this invention are normally only parts of a linearly variable differential transformer (LVDT), which requires additional circuitry for completion. This additional circuitry of the LVDT includes a secondary voltage summation means or secondary current summation means which is used to control and regulate the primary voltage in a closed loop circuit. This circuitry is used to eliminate spurious voltage changes in the secondary loops due to supply voltage, and temperature or frequency changes and to improve the accuracy of the voltage differential readings obtained. The secondary current summation circuitry is frequently included in an electrical unit attached to the housing of the transducer of this invention.

It is an object of this invention to produce a differential pressure transducer which will make an accurate analogue conversion of changes in pressure differential between two pressure sources to changes in voltage differential between two secondary loops of a transformer.

It is an object to produce a voltage differential of increased accuracy on the signal output leads of the secondary loops while eliminating the effects of spurious voltage and current changes in the supply voltage as well as those fluctuations due to temperature and frequency changes. This improved accuracy is obtained by maintaining constant the sum of the voltages appearing at the signal output leads. A detector regulator compensates for spurious signals which would otherwise tend to change this voltage sum.

It is a further object to increase the accuracy of the analogue conversion in the preferred form of the invention by allowing only minimal movement of the magnetically permeable core even though significant variations in pressure differential occur between a variable pressure and a reference pressure. The small core movement minimizes error induced into the transformer due to hysteresis. In its preferred form, the differential pressure transducer will cause a voltage differential across the secondary loops of ±5 to 7 volts with a core displacement of only ±0.10 inches, depending on the voltage input to the transformer.

It is a further object to create a differential pressure transducer having a compact design with easy accessibility to component parts should replacement of parts ever become necessary. In addition, this instrument is sturdily built to withstand rugged treatment over an increased useful life, as compared with differential pressure transducers currently in use.

In a broad aspect this invention is in a differential pressure transducer utilizing a pressure sensing means, a magnetically permeable core means movable along a linear path and operatively connected to said pressure sensing means, and a transformer axially aligned about said linear path and having an axial opening therethrough within which said magnetically permeable core means moves and having a primary coil and having separate secondary loops spaced longitudinally along said linear path, the improvement comprising a bridge rectifying means connected to said secondary loops and terminating in output signal secondary leads, means for maintaining a constant voltage sum on said secondary leads comprising a detector-regulator on one side of the input to said primary coil, resistors in series across said output signal secondary leads, and a feedback lead from between said resistors in series to said detector regulator.

Preferably, the pressure sensing means, the magnetically permeable core, and the transformer are all located within the same housing. This feature of unitary construction reduces the vulnerability of the unit to shock and other mistreatment. The circuitry for maintaining a constant voltage sum on the secondary output leads may be located in the same housing or in an electrical regulating box attached to the main housing.

In the applications of this differential pressure transducer where accuracy is required, a non-magnetic metal sheath or guide may be used to surround at least a portion of the core. This non-magnetic sheath is fastened to the housing and thereby stabilizes the core. Such a sheath is particularly useful where the core is quite long, since the core is mounted as a cantilever onto the extensible end of the bellows and the free end of the core is relatively unstable. The support furnished to the free end of the core by the sheath prevents this instability from introducing error into the system as voltage fluctuations in the secondary loops.

The advantages and detailed construction of the foregoing features, as incorporated in the preferred embodiment of this differential pressure transducer will be made more apparent upon reference to the accompanying drawings and the following description thereof.

FIG. 1 is a partially cutaway sectional view of the preferred embodiment of the differential pressure transducer of this invention.

FIG. 2 indicates diagrammatically an electrical circuit of the linearly variable differential transformer type working to maintain a constant voltage sum of the secondary leads.

Referring now to FIG. 1 there is shown a main housing 1 to which an electrical regulating box 32 is attached by machine screws (not shown). Main housing 1 has several separate cavities located therein and is comprised of several separate pieces. Housing 1 encompasses a first cavity 45, within which is located bellows 4. Bellows 4 has a fixed end 46 welded to upper bellows base 3, a part of housing 1. Upper bellows base 3 is fastened to the balance of housing 1 by means of screws 23. There is an axial passageway 49 which extends through upper bellows base 3 and which opens into the interior of bellows 4. Housing 1 also has a second cavity 50 which is in communication with the interior of bellows 4 by means of passageway 49. First cavity 45 and second cavity 50 are separated from each other by means of an air tight seal formed by O-ring 27 which is positioned between upper bellows base 3 and the balance of housing 1. The cavities 45 and 50 together with the bellows 4 form the pressure sensing means of this invention.

Pressure ports 44 and 2 are welded to housing 1 at channels in housing 1 leading to first cavity 45 and second cavity 50 respectively. Pressure ports 44 and 2 are adaptable to pipe fittings, tubes, and other connecting devices so that pressure from exterior sources can be channeled through pressure port 44 to first cavity 45 and through pressure port 2 to second cavity 50. Pressure within first cavity 45 thereby acts against the adjacent walls of housing 1 including the inner surface of removable cover 10, the outer surfaces of bellows 4, the lower end of upper bellows base 3, and pressure port 44. Pressure within second cavity 50 acts upon the adjacent surfaces of housing 1, upon the walls of passageway 49, upon the inner surfaces of bellows 4, upon closed extensible end 47 which is welded to lower bellows base 6, upon the interior surface of core sheath or guide 11, and upon pressure port 2. Of the surfaces against which pressures in first cavity 45 and in second cavity 50 act, only extensible end 47 and the interior and exterior surfaces of bellows 4 are displaceable. Therefore, when pressure within first cavity 45 increases with respect to pressure within second cavity 50, bellows 5 will contract thereby moving extensible end 47 of bellows 4 closer to upper bellows base 3. When the pressure within second cavity 50 increases with respect to pressure in first cavity 45, extensible end 47 of bellows 4 moves axially away from upper bellows base 3, thereby expanding bellows 4.

Housing 1 is equipped with a third cavity 51, within which is located transformer 13. In assembling the pressure differential transducer, core guide 11 is lowered from the opening in the top of housing 1 into third cavity 51. Core guide 11 is threadably engaged to housing 1, locked in place by locking screws 52, and sealed against housing 1 by means of O-ring 26, thereby creating a pressure tight seal between second cavity 50 and third cavity 51. A transformer adjustment platform 15 having an axial threaded hole is threadably engaged to a lower externally threaded portion of core guide 11. Platform 15 can thereby be variably positioned with respect to core guide 11 to adjust the longitudinal positioning of transformer 13 within cavity 51. Transformer 13 is securely held in place by upper locking plate 12. Plate 12 has a threaded axial hole therethrough which is engaged around the threaded upper portion of the stem of core guide 11. Upper locking plate 12 is threaded upon the stem of core guide 11 until it is resisted by the upper surface of transformer 13. The resulting pressure at the thread interfaces between upper plate 12 and the stem of core guide 11 and between the threaded interfaces between platform 15 and core guide 11 thereby locks upper plate 12 in place against core guide 11 and platform 15 against core guide 11 and holds transformer 13 rigidly in place. There is an indentation formed in the upper wall of housing 1 which allows the cable 37 to pass from transformer 13 up and around upper plate 12 and out of housing 1 through a passageway 8 into cavity 51 in the wall of housing 1. Cable 37 passes from housing 1 into electrical regulating box 32, where there is located the circuitry for maintaining a constant voltage sum on the secondary leads as illustrated in FIG. 2. Cable 37 contains the wires 38 and 39 which lead from terminals A and B respectively in electrical interface 40 of electrical regulating box 32 to the primary coil 31 of transformer 13. Cable 37 also contains wires 33, 34, 35, and 36 which connect secondary loops 29 and 29' of the secondary coil of transformer 13 to bridge rectifier means 48, located in electrical regulating box 32.

There is an opening in housing 1 into third cavity 51 at the upper end of housing 1. This opening is covered by a removable cover 20 which is sealed to the adjacent edges of the balence of housing 1 by gasket 53. An air tight seal is formed when machine screws 22 are used to fasten cover 20 to the remainder of housing 1. Transformer 13 is thereby removably positioned within the third cavity and is accessible upon removal of cover plate 20, a part of housing 1, and upper adjustment plate 12.

At the lower end of housing 1, within cavity 45, a core means 5 is fixed to the extensible end of bellows 4. Core means 5 is comprised of lower bellows base 6, and extension 24, shaft 54, and magnetically permeable slug 14. Shaft 54 of core means 5 extends from lower bellows base 6 axially back through bellows 4, through cavity 50, and into the annular opening within core guide 11 which in turn is positioned within an annular opening of transformer 13. Shaft 54 is threadably engaged to magnetically preamble slug 14, at the transformer end of core means 5. The movement of the lower end 47 of bellows 4 thereby alters the position of slug 14 along a linear path with respect to transformer 13. It is this movement which induces a change in voltage in the secondary loops 29 and 29' of transformer 13. Secondary loops 29 and 29' are spaced longitudinally along the transformer axis which is also the linear path of movement of the slug 14 so that slug 14 may be more directly radially aligned with one of the secondary loops than with the other. It is this difference in alignment which creates different voltages on leads C and D at electric interface 40.

To increase the effective life and to increase the possible pressure differentials to which the bellows of this unit may be subjected, a spring support may be fastened to the extensible end of the bellows. Below lower bellows base 6 is fixed a spring support 9, secured in place against lower bellows base 6 by means of a stop nut 55 threadably engaged onto threaded end extension 24 of core 5. Spring support 9 is thereby fastened to the extensible end 47 of bellows 4. At the upper end of spring support 9 a collar 56 flares radially outward from bellows 4 and extends a sufficient radial distance to provide a support to accommodate spring 7. Spring 7 is a square coil spring machined from solid stock and having solid ends and preloaded in a compressed condition. This design eliminates variable end conditions, such as cocking and rotation and makes possible close control of spring rate and linearity. Spring 7 is compressed between collar 56 of spring support 9 and spring adjustment ring 18 and is axially aligned with bellows 4. Spring adjustment ring 18 is threaded on its exterior surface and thereby threadably engaged to the inner threaded walls of housing 1. Spring adjustment ring 18 has an axial hole therethrough so that it may pass over spring support 9 as well as bellows 4 and adjustment nut 55 as it is threaded into housing 1. The hole through ring 18 is of sufficiently small diameter so that an annular shoulder broad enough to support spring 7 remains at the perimeter of ring 18. The spring and bellows are chosen and the spring is preloaded so that the maximum possible deflection of the expansible end of the bellows is within the range at which the relationship of the bellows load to axial deflection of the spring is most linear. The spring can either coaxially surround the bellows or it may have a common axis with the bellows but longitudinally displaced from the bellows and adjacent to the extensible end of the bellows.

Through the use of spring 7, collar 56 and adjustment ring 18, a change in voltage differential between the secondary loops 29 and 29' of transformer 13 resulting from a relatively large change in pressure differential between the pressures in cavities 45 and 50 can be attained with only a very minimal movement of bellows 4. Through adjustment of the axial positioning of transformer 13 and adjustment of the preload on spring 7, a null point can be achieved whereby voltages are equal at leads C and D for a specific pressure differential between cavities 45 and 50. For example, spring 7 is compressed, by adjusting adjustment ring 18, so that it offsets the median pressure differential likely to occur between second cavity 50 and first cavity 45. The position of transformer 13 is longitudinally adjusted so that the voltage at C equals the voltage at D at the electrical interface for this median pressure differential. If second cavity 50 is the high pressure chamber and first cavity 45 is the reference chamber, an increase in the pressure differential between cavity 50 and cavity 45 will cause the lower end 47 of bellows 4 to move axially downward, thereby further compressing spring 7. This will cause slug 14 to move out of direct axial alignment with secondary loop 29 while remaining in direct axial alignment with secondary loop 29'. This results in a greater voltage at C with respect to the voltage at D because of the larger induction effected in secondary loop 29' due to the magnetically permeable slug 14. Conversely, a decrease in pressure differential between cavity 50 and cavity 45 will cause the compressive force in spring 7 to overcome the force resulting from the pressure differential between cavity 50 and cavity 45, and thereby force bellows 4 to contract. This allows spring 7 to expand. However, the linear displacement of end 47 of bellows 4 is only a fraction of what it would be were bellows 4 allowed to expand and contract freely without the inhibiting influence of spring 7. This movement is sufficient however, to cause slug 14 to move out of axial alignment with secondary loop 29' while remaining in direct axial alignment with secondary loop 29. This results in a greater voltage at D with respect to the voltage at C.

Because of the minimal movement of the extensible end 47 of bellows 4 which is sufficient to create a variation in voltage differential between the secondary loops of transformer 13, an over travel stop adjusting nut 19 is threaded into housing 1 behind ring 18. This over travel stop adjusting nut 19 prevents damage to the instrument by limiting the expansion of the bellows 4 by stopping the longitudinal movement of that portion of spring support 9 adjacent to the extensible end 47 of bellows 4. Similarly, the over travel stop adjusting nut 19 limits the contracting movement of bellows 4 by halting stop nut 55 in its longitudinal movement toward fixed end 46 of bellows 4.

There is an opening into the first cavity 45 of housing 1 at the threaded end of housing 1. An O-ring 25 is positioned at the edges of the threaded end of the balance of housing 1 and a removable cover 10, a part of housing 1, is threadably fastened across the opening, thereby trapping O-ring 25 which forms an air tight seal between cover 10 and the remainder of housing 1. Removable cover 10 thereby protects spring 7, spring support 9, core means 5, and bellows 4, while still allowing these component parts to be removed from housing 1.

In the electrical regulating box 32, there is an electrical connection interface 40, containing interface terminals A, B, C, and D. These terminals are the connections at which exterior power and exterior instruments are connected to the LVDT. Parts of the LVDT are common to the differential pressure transducer of this invention. The LVDT, as used with the illustrated embodiment of this invention, comprises the circuitry contained in electrical regulating box 32 for maintaining a constant voltage sum on the secondary leads C and D as well as the primary coil 31 and the secondary loops 29 and 29' of the transformer 13. The entire circuitry of the LVDT is illustrated in FIG. 2.

As illustrated in FIG. 2, an alternating current voltage input at A and B induces a fluctuating magnetic field about the primary coil 31 of the LVDT. This fluctuating magnetic field induces separate alternating currents in secondary loops or windings 29 and 29'. Loops 29 and 29' are each comprised of a series of windings about the primary coil 31. Loops 29 and 29' are separate and are longitudinally displaced from each other with respect to the axis of the transformer 13. Secondary loop 29 is nearest locking plate 12 while secondary loop 29' is nearest transformer adjustment platform 15. The magnitude of the electric current induced in each of loops 29 and 29' is governed by the proximity of slug 14 to the primary coil and to the secondary loop concerned. A movement of slug 14 of core means 5 will change the voltage output from the secondary loops 29 and 29'. As shown diagrammatically, the secondary loop outputs are connected to full wave bridge rectifiers 48 in electrical regulating box 32 by wires 33, 34, 35, and 36. Bridge rectifiers 48 which are connected in opposition to each other and are grounded at their point of connection, and are in turn connected to suitable resistors such as 41, 42, and 43, to provide a desired direct voltage on output signal secondary leads 16 and 17 which in turn provide the varying direct current voltage output levels at C and D. The actual resulting output induced by the core slug 14 in the LVDT unit and as modified by the demodulating circuit is thereby transmitted to terminals C and D in electrical interface 40.

In the LVDT utilized in this invention, the sum of the voltages at C and D, that is the total voltage output with respect to ground of the voltages at C and D, is always constant throughout the operation of the differential pressure transducer of this invention. The stability of this total output is a measure of the spurious electrical impulses which are induced into the system through hysteresis, variations in temperature, and other undesireable sources. This constant voltage sum serves as the means by which such spurious signals can be eliminated from the system. The voltage sum is maintained constant by the secondary current summation circuitry, which is comprised of resistors 57 and 58, feedback wire 28, and detector-regulator 30 placed between segments of wire 39 on one side of the input to the primary coil 31. The significance of this circuitry can be more fully explained by an example. In the null or neutral condition, the slug 14 is symmetrically positioned with respect to the secondary loops 29 and 29'. Due to the AC current in primary coil 31, the voltages appearing at the output signal secondary leads of the two bridge rectifiers are equal but opposed to each other. For example, if the voltage from the upper regulator 48 is +30 volts, then the voltage from the lower rectifier 48 will be −30 volts. The total potential differential, therefore, is an absolute value of 60 volts. If the resistors 57 and 58 have equal resistance values, (though they need not have), the voltage appearing on the feedback wire 28 would then have an absolute value of 30 volts. That is, its voltage would be 30 volts above the lower rectifier output voltage and 30 volts below the upper rectifier output voltage. This condition at feedback wire 28 is the reference condition in detector-regulator 30. Deviations from this reference condition will cause counteracting adjustments in the voltage in primary coil 31 by activation of detector-regulator 30.

The normal voltage differential occuring between secondary coils 29 and 29' due to pressure differential changes will not cause a deviation in the reference circuit condition. For example, if slug 14 moves vertically upward, and the voltage output from upper rectifier 48 increases to +35 volts, the voltage from lower rectifier 48 should and will change to −25 volts. The voltage differential across the resistor 57 and 58 is still an absolute value of 60 volts, however, and the voltage level on feedback wire 28 will therefore still be 30 volts above the voltage level of lower rectifier 48 and 30 volts below the voltage level of upper rectifier 48. Activation of detector-regulator 30 occurs only when there is a deviation in the sum of the absolute values of the secondary loop output voltages, as may occur due to spurious electrical impulses.

In the overall operation of the pressure transducer of this invention, either cavity 45 or cavity 50 can be used as a reference pressure chamber. Assuming for the purposes of illustration that cavity 45 is the reference pressure chamber, cavity 50 is then connected to a high pressure source through outlet port 2. The higher pressure in cavity 50 is transmitted to the interior of bellows 4 through passageway 49 in upper bellows base 3. As this pressure base increases, it forces bellows 4 to expand. Since bellows 4 is fixed to housing 1 through upper base 3 at a fixed end 46 of the bellows, the expansion of bellows 4 takes place along the bellows axis at extensible end 47 of bellows 4. This expansion must further compress an already precompressed spring 7, within cavity 45, thereby requiring a great increase in pressure with cavity 50 to effect a minimal movement of extensible end 47 of bellows 4. This minimal movement of bellows 4 is transmitted to lower bellows base 6, shaft 54, and then to slug 14, which are all component parts of core means 5. The movement of slug 14, though minimal, is sufficient to create the desired voltage differential in response to the change in pressure differential between cavity 50 and cavity 45. This movement of slug 14 away from the vicinity of secondary loop 29 and toward loop 29' causes the voltage induced in loop 29 of the secondary coil to decrease and the voltage induced in loop 29' to increase. The voltage at C thereby increases with respect to the voltage at D.

When the pressure within cavity 50 decreases with respect to the pressure within cavity 45, the bellows 4 contracts and the extensible end 47 of bellows 4 moves toward the fixed end 46 of bellows 4, carrying the core means 5. The movement of slug 14 of core means 5 with respect to the transformer 13 causes the voltage induced in secondary loop 29 to increase and the voltage induced in secondary loop 29' to decrease. This results in an increased voltage at D and a decreased voltage at C. Throughout the operation of the pressure differential transducer, however, the sum of the voltages at D and C is constant.

In the operation of the differential pressure transducer of this invention, either the first or the second cavity may be used as a reference while the remaining of these cavities is used to transmit an independently varying pressure. Therefore, cavity 50 may be used as the reference cavity and cavity 45 may be utilized as the high pressure cavity, as an alternative to the reverse arrangement previously discussed. In such a case, bellows 4 would expand when pressure 45 decreased with respect to the pressure in cavity 50, and the bellows would contract when the pressure within cavity 45 increased with respect to the pressure within cavity 50.

The foregoing detailed description and illustrations of the preferred embodiment of this invention have been given for clearness of understanding only, and no unnecessary limitations should be construed therefrom as modifications will be obvious to those skilled in the art.

We claim as our invention:

1. A differential pressure transducer comprising:
   a. a housing having first and second separate cavities therein,
   b. separate pressure ports connecting each of said cavities to the exterior of said housing,
   c. a bellows having a fixed end and an extensible end located in said first cavity and communicating with said second cavity and connected to said housing at said fixed end and connected to a core means at said extensible end,
   d. a transformer axially aligned with said bellows and fastened to said housing and having an axial opening therethrough and having a primary coil positioned coaxially about said transformer axis and having separate secondary loops coaxial with respect to said primary coil and spaced longitudinally along the transformer axis,
   e. bridge rectifying means connected to said secondary loops and terminating in output signal secondary leads,
   f. means for maintaining a constant voltage sum on said secondary leads comprising a detector-regulator on one side of the input to said primary coil, resistors in series across said output signal secondary leads, and a feedback lead from between said resistors in series to said detector-regulator, and
   g. a magnetically permeable core means fastened to said extensible end of said bellows and extending into said opening in said transformer and longitudinally positionable with respect to said opening in said transformer, whereby a change in pressure differential between said first and second cavities causes a change in voltages to occur in said secondary loops of said transformer when voltage is applied to said primary coil of said transformer.

2. The differential pressure transducer of claim 1 further characterized in that said bellows is provided with a spring loading means having external adjustment means thereby to permit adjustment of the voltage differential between said secondary loops by minimal movement of said bellows.

3. The differential pressure transducer of claim 2 further characterized in that said spring loading means comprises a square wire spring preloaded in a compressed condition.

4. The differential pressure transducer of claim 1 further characterized in that said resistors in series have equal resistance values.

5. The differential pressure transducer of claim 1 wherein said bridge rectifying means comprises two full wave rectifiers connected in opposition to each other and grounded at their point of connection, and each of said full wave rectifiers is connected to only one of said separate secondary loops.

6. In a differential pressure transducer utilizing a pressure sensing means, a magnetically permeable core means movable along a linear path and operatively connected to said pressure sensing means, and a transformer axially aligned about said linear path and having an axial opening therethrough within which said magnetically permeable core means moves and having a primary coil and having separate secondary loops spaced longitudinally along said linear path, the improvement comprising a bridge rectifying means connected to said secondary loops and terminating in output signal secondary leads, means for maintaining a constant voltage sum on said secondary leads comprising a detector-regulator on one side of the input to said primary coil, resistors in series across said output signal secondary leads, and a feedback lead from between said resistors in series to said detector regulator.

* * * * *